United States Patent [19]

Miller et al.

[11] Patent Number: 5,703,975
[45] Date of Patent: Dec. 30, 1997

[54] INTERFEROMETRIC SWITCH

[75] Inventors: William J. Miller; Daniel A. Nolan, both of Corning, N.Y.

[73] Assignee: Corning Incorporated, Corning, N.Y.

[21] Appl. No.: 672,188

[22] Filed: Jun. 27, 1996

Related U.S. Application Data

[63] Continuation-in-part of Ser. No. 489,090, Jun. 9, 1995, abandoned.

[51] Int. Cl.⁶ ..................................... G02B 6/26
[52] U.S. Cl. ..................... 385/16; 372/6; 385/14; 385/21; 385/132; 385/122; 385/142; 385/42
[58] Field of Search ................. 385/42, 96, 2, 385/3, 4, 8, 9, 14, 10, 16, 17, 20, 21, 24, 132, 141, 122, 142; 372/6

[56] References Cited

U.S. PATENT DOCUMENTS

| | | | |
|---|---|---|---|
| 4,863,230 | 9/1989 | Webb | 350/96.15 |
| 4,881,788 | 11/1989 | Doran | 350/96.15 |
| 5,044,715 | 9/1991 | Kawachi et al. | 385/16 |
| 5,148,503 | 9/1992 | Skeie | 385/16 |
| 5,375,010 | 12/1994 | Zervas et al. | 372/6 |
| 5,377,284 | 12/1994 | Bulow | 385/16 |

*Primary Examiner*—John Ngo
*Attorney, Agent, or Firm*—William J. Simmons, Jr.

[57] ABSTRACT

A compact monolithic interferometric switch such as a Mach-Zehnder switch is formed such that one of the waveguide paths between the input and output couplers contains a material having exhibits a resonant nonlinearity, whereby its refractive index changes when pump power propagates through it. Each of the waveguide paths has a different propagation constant whereby signal light is subjected to a different delay in each path when no pump power is propagating through the rare nonlinear path. An input signal applied to the input of the switch appears at a first output terminal when the pump power does not propagate through the nonlinear path, and it appears at a second output terminal when the pump power is applied to the nonlinear path. Switching occurs at relatively low levels of pump power.

33 Claims, 5 Drawing Sheets

INTERFEROMETRIC SWITCH

CROSS-REFERENCE TO RELATED APPLICATIONS

The present application is a continuation-in-part of U.S. patent application Ser. No. 08/489,090, filed Jun. 9, 1995, now abandoned, the disclosure of which is hereby incorporated by reference herein.

BACKGROUND OF THE INVENTION

The present invention relates to optical power switching devices. Optical switches with switching speeds up to 1 gigahertz are required for numerous applications including local area networks, sensor arrays and communications systems. Many forms of optical switching devices have been developed. Typical examples are multiple-quantum-well waveguide switches, strained-layer superlattice directional couplers and optical fiber switches. These devices are based on the nonlinear effect of the material that forms them. In the case of semiconductor devices, the required critical power for a switch is less than 1 mW. Until recently optical fiber switches had been fabricated from optical fibers having silica based cores. The optical power required for these optical fiber switches is on the order of several kilowatts since the nonlinear coefficient of silica is extremely small.

The publication, P. L. Chu et al. "Optical Switching in Twin-Core Erbium-Doped Fibers", Optics Letters, Feb. 15, 1992, Vol. 17, No. 4, pp. 255–257 reports that it was demonstrated that erbium-doped fiber has a nonlinear coefficient approximately 1 million times greater than that of fused silica. However, the large increase in nonlinear index in erbium-doped fiber is accompanied by a large absorption loss and a slowing of the response time. The switch disclosed by Chu et al. consists of a 2.26 m long piece of twin core erbium-doped optical fiber. It is difficult to input light to and output light from a twin core or a double core optical fiber. Moreover, a long length of the Chu et al. Erbium-doped fiber is required. Also, low cross-talk cannot be achieved since the power difference in the two cores affects the coupling mechanism. This is explained by Caglioti et al. in "Limitations to all-optical switching using nonlinear couplers in the presence of linear and nonlinear absorption and saturation", Journal of the Optical Society of America B, vol. 5, No. 2, Feb. 1988, pp. 472–482. The two-core fiber requires large power inputs or long fiber lengths that need to be configured in such a way as to prevent environmentally-induced phase shifts such as bend-induced phase shifts.

The publication, R. H. Pantell et al. "Analysis of Nonlinear Optical Switching in an Erbium-Doped Fiber", Journal of Lightwave Technology, Vol. 11, No. 9, September 1993, pp. 1416–1424 discusses switch configurations employing both a Mach-Zehnder configuration and a two-mode fiber configuration, each configuration utilizing an Erbium-doped core.

Pantell et al. describe an experiment in which a 3.4 m length of two-mode fiber was utilized. A phase shift of $\pi$ required an absorbed pump power of 15.5 mW. The signal was launched to inject approximately equal powers in the LP01 and LP11 modes. This type of signal injection is difficult to implement, and the device is unstable with respect to external vibrations and perturbations.

One or both fibers in the phase shift region of the Mach-Zehnder device of Pantell et al. is made of Erbium-doped fiber, the pump power being coupled into only one of them. Since it is stated at page 1417 that the pump power requirement of a two mode fiber (TMF) switch is generally larger than for an equivalent Mach-Zehnder (MZ) switch by a factor of 2–4, it follows that a Mach-Zehnder switch of this type would be about 85 to 170 cm long provided that the power remained constant. In the absence of pump power all of the signal power appears at output port 2. When sufficient pump power is applied to cause a phase difference of $\pi/2$, the signal switches to output port 3. Pantell et al. indicate that the fiber core is heated due to the generation of phonons by the pump power in the fiber core and that the two mode fiber is advantageous over the Mach-Zehnder interferometer since the two modes utilize the same guiding region and therefore react similarly to environmental changes.

The Pantell two-mode device is very sensitive to the launch condition and any perturbations along the length of the two mode fiber. Also, it is not directly compatible with single-mode operation.

In order to attain compactness and ease of handling, it would be advantageous for nonlinear switches of the Mach-Zehnder type to be formed as a monolithic structure. For such devices to be practical, their length should not exceed about 15 cm.

SUMMARY OF THE INVENTION

It is therefore an object of the present invention to provide an optical switch that overcomes the heretofore noted disadvantages of prior an switches. A further object is to provide a compact, low power, low cross-talk nonlinear optical switch.

Briefly, the monolithic interferometric switch according to one aspect of the present invention comprises input coupler means for splitting an input signal into N equal signal components, where N>1. Combining means, having at least first and second output terminals, is provided for combining the N components. N optical waveguide paths connect the N signal components to the combining means. At least one of the waveguide paths contains a material having a resonant nonlinearity, whereby its refractive index changes when pump power propagates through it. The input coupler means and the combining means are free from nonlinear material. The input coupler means, the combining means and the optical waveguide paths are in thermal contact with a matrix glass body.

In one embodiment the switch consists of first and second optical fibers extending longitudinally through an elongated body of matrix glass. The body includes a phase shift region and two spaced coupler regions at opposite ends of the phase shift region. The diameter of the body and the diameters of the fibers are smaller in the coupler regions than in the phase shift region. At least that portion of the first fiber that is in the phase shift region contains a material having a resonant nonlinearity, whereby the refractive index of the first fiber changes when pump power propagates through it. The fibers have different propagation constants in the phase shift region in the absence of pump power propagating through the first fiber so that the first fiber subjects the light propagating therethrough to a delay that is different from the delay experienced by light propagating through the second fiber.

According to a further aspect of the invention, an interferometric switch such as a Mach-Zehnder switch or other intefferometric switch, includes first and second optical couplers and first and second optical paths extending between these couplers. The switch further includes means defining a first input port connected to the first coupler and a first output port connected to the second coupler. At least one of the paths is a nonlinear path incorporating a material having a resonant non-linearity. The refractive index of the material and hence the optical path length of the nonlinear path changes in response to optical power applied through the path. As further discussed below, the term "optical path length" is a measure of the time required for a light signal at a given wavelength and in a given propagation mode to pass through the path from one end to the other. The optical path length is related to the physical length of the path and to the parameters of the path which determine the phase velocity of light on the path, such as the refractive indices of the materials in the path and the physical configuration of the path. In the absence of optical pumping power, the optical path lengths are different from one another. The device has a zero-power transfer function relating the proportion of light supplied through the first input port which appears at the first output port to wavelength. As used in this disclosure, the term "zero-power transfer function" refers to the transfer function which prevails under low-power conditions, i.e., where the properties of the nonlinear path are substantially uninfluenced by pumping power. The zero-power transfer function resembles the transfer function of a conventional Mach-Zehnder intefferometric device; it includes at least one peak at a first wavelength and at least one valley at a second wavelength, and typically includes a series of alternating peaks and valleys. At each peak, substantially all of the light supplied through the input port appears at the first output port, whereas at each valley substantially none of the light applied through the first input port appears at the first output port. Most preferably, the peaks and valleys of the zero-power transfer function for wavelengths in an operating range corresponding to the range of signal wavelengths to be processed are relatively closely spaced, i.e., separated by a difference $\Delta\lambda$ less than about 100 nm wavelength, preferably less than about 10 nm wavelength and most preferably, about 6 nm or less, typically between about 1 nm and about 6 nm.

This aspect of the present invention incorporates the realization that, when the zero-power transfer function incorporates relatively closely spaced peaks and valleys, only a small change in the optical path length of the nonlinear path is required to switch the device between a first condition, in which substantially all of the light at a given signal wavelength supplied through the input port appears at the first output port and a second condition in which substantially none of the light at such signal wavelength applied at the first input port appears at the first output port. The degree of change in the path length required to induce switching may be several orders of magnitude less than the degree of change in path length required to induce switching in a comparable device wherein the optical path lengths at zero power are equal to one another. Such a comparable device has a flat zero-power transfer function. One way to conceptualize the difference is that where the zero-power transfer function includes closely spaced peaks and valleys, only a small difference in the spacings between the peaks and valleys will suffice to shift a peak into or out of alignment with the signal wavelength being transmitted.

The device according to this aspect of the invention provides several significant benefits. The amount of optical power which must be applied to the device to induce switching can be substantially less than that required in a comparable device with a flat zero-power transfer function. This greatly reduces the heat generated within the device during operation and reduces thermal effects. Also, the physical length of the nonlinear path required to permit switching at a given level of optical power may be substantially shorter in the device according to this aspect of the present invention than in a comparable device using initially equal optical path lengths. This, in turn, makes it practical to provide the requisite switching action in a monolithic device such as discussed above.

Preferably, the device includes a second output port connected to the second coupler. The second output port may have a transfer function substantially inverse to the transfer function of the first output port, so that the peaks of the second-output transfer function correspond to the valleys of the first-output transfer function and vice versa. The device including two output ports may be used to switch light at a given wavelength selectively between two branches of a network, or to select particular wavelengths for diversion along one branch of a network. The device with only a single output port may be employed as a tunable wavelength-selective filter.

According to a further aspect of the present invention, the principles discussed can be applied in multi-stage intefferometric devices. A device according to this aspect of the invention includes at least three optical couplers and a plurality of optical paths extending between the couplers. The paths are arranged in groups so that the couplers are connected to one another in series by the groups of paths. Each group includes at least two paths in parallel with one another. One of the couplers constitutes an input coupler at an input end of the series whereas another coupler at the opposite end of the series constitutes the output coupler. The device further includes means defining a signal input port connected to the input coupler and a first output port connected to the output coupler. At least one of the paths in the device is a nonlinear path as discussed above having optical path length which changes when optical power propagates through the path. The path lengths of the parallel-connected paths in at least one of the groups of paths, and preferably in all of such groups of paths, are different from one another in the absence of optical pumping power applied through the device.

Here again the device has a zero-power transfer function including a peak at a first wavelength and a valley at a second wavelength, and these peaks and valleys desirably are spaced at close intervals as discussed above. Most preferably, each of the various groups of paths includes at least one nonlinear path having the nonlinear material. The nonlinear material included in the nonlinear paths may be responsive to optical power applied as radiation in a pumping wavelength range remote from the signal band encompassing the first and second wavelengths. The couplers may be adapted to direct light in this pumping wavelength range substantially along the nonlinear paths.

The nonlinear paths may be directly connected with one another at each of the couplers so that the nonlinear paths form a continuous nonlinear path array extending through several couplers. The switch may further include a pumping input port connected to one end of this nonlinear path array. The couplers desirably are effective to couple light in the signal wavelength band between paths at each coupler but substantially ineffective to couple light in the pumping wavelength band between the paths. Thus, pumping light in the pumping wavelength band may be applied through the pumping input port and will propagate substantially only in the nonlinear path array. In a particularly preferred arrangement, all of the paths in the device are constituted by optical fibers, and the nonlinear path array is constituted by a first continuous fiber extending through the various couplers. The first continuous fiber may include a plurality of spaced apart nonlinear sections incorporating the nonlinear material and a plurality of linear sections free of the nonlinear material, the linear sections extending throughout the various couplers. The device may further include a second continuous fiber extending through several couplers, the second continuous fiber constituting a second path array including paths in each of several groups directly connected with one another. Preferably, the device, when formed using fibers, includes a monolithic glass body surrounding the fibers in a thermal contact therewith. Each of the couplers may be an overclad tapered coupler including narrowed portions of the fibers and the body, the narrow portions of the body serving as the overcladding of each such coupler.

Devices according to this aspect of the present invention can combine the efficient switching action discussed above with any of the various transfer-function shapes associated with multi-stage interferometric devices. One particular useful device of this type provides a relatively narrow peak in the zero-power transfer function of one port with relatively broad valleys on either side of such peak. As optical power is applied to the nonlinear paths, the location of the peak shifts. Such a device can be used to select one wavelength from among several in a wavelength-division multiplexing system using several relatively closely-spaced signal wavelengths.

DETAILED DESCRIPTION

Figure 1:
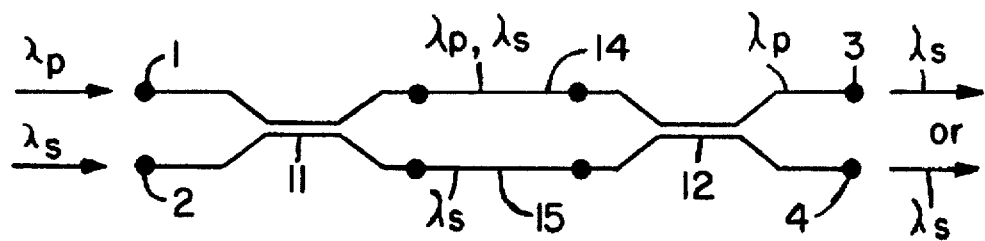
FIG. 1 is a schematic diagram of a prior art Mach-Zehnder switch.

A Mach-Zehnder switch is schematically illustrated in FIG. 1. A first or input-end coupler 11 and a second or output-end coupler 12 are concatenated by waveguide paths 14 and 15. The device includes first and second input ports 1 and 2 connected to the input coupler 11 and also includes first and second output ports 3 and 4 connected to the output coupler 12. The couplers are usually 3 db couplers, whereby the signal power that is applied to input port 2, for example, is evenly divided between the two outputs of coupler 11, and thus directed along both paths 14 and 15 to the second or output-end coupler 12. At the output-end coupler, the signals directed along both paths are combined with one another. Depending upon the relative phase of the signals arriving at output end coupler, the signal will appear at the first output port 3 or at the second output port 4. One or both of waveguide paths 14 and 15 contains a material having a resonant nonlinearity, whereby a refractive index change is induced by absorption of light within a predetermined wavelength band. The rare earth elements are particularly suitable since they exhibit large nonlinear refractive indices. The rare earth element erbium exhibits a very large nonlinear index. The use of neodymium as the nonlinear material would increase switching speed, but more switching power would be required. There are also other dopants with which a population inversion can be achieved in order to provide a resonant nonlinearity. Examples include the transition metals such as chromium and titanium.

The light absorbed by the nonlinear material can be a pump or gating pulse having a wavelength different from that of the signal. Alternatively, the signal wavelength can be within that band of wavelengths that induces an index change in the nonlinear material. In this case, separate signal and gating pulses can be applied to one or both input ports, or a single signal pulse can be applied to one input port (as in the case of a power limiter), its amplitude determining whether switching occurs, i.e. it determines the output port at which the output signal appears. In the present discussion it is assumed that waveguide path 14 is the nonlinear path. Pump power is shown as being applied to input port 1, and the signal is shown as being applied to input port 2. If desired, both pump and signal power could be applied to the same input port.

In the Pantell et al. switch, the characteristics of coupler 11 are such that essentially all of the pump power applied to input port 1 remains uncoupled whereby it propagates only in waveguide path 14. In the absence of pump power applied to first input port 1, the signal appears at first output port 3. This is accomplished by appropriately fixing the phase shift between the two waveguide paths 14 and 15 at zero. Stated another way, the optical path lengths of paths 14 and 15 are equal in the absence of pumping power. The pump power causes a change in refractive index in waveguide path 14. When the pump is turned on with enough power to induce a difference in optical path length between paths 14 and 15 equal to a phase shift of $\pi$ at the signal wavelength, the signal fully switches from output port 3 to output port 4.

Figure 2:
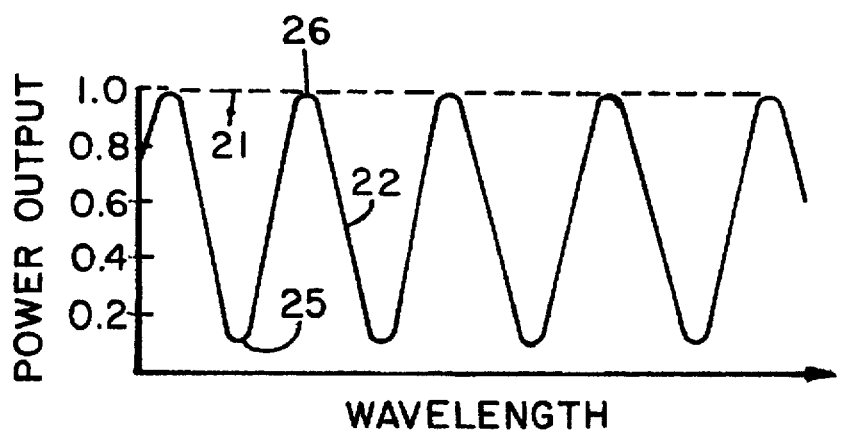
FIG. 2 is a plot of power output vs. wavelength for two types of Mach-Zehnder devices.

Output power is plotted in FIG. 2 as a function of wavelength for two different single-stage Mach-Zehnder devices. Curve 21 is a plot of the zero-power transfer function relating the proportion of light signal power supplied through first input port 1 which appears at first output port 3 to the wavelength of the light signal. The device represented by curve 21 has paths 14 and 15 with optical path lengths of paths which are equal in the absence of pumping power. That is, in the device represented by curve 21, the product of the physical length and propagation constant for both paths are equal when the optical power applied through the paths is low or zero. Curve 22 represents the zero-power transfer function relating the proportion of optical signal power applied at the first input port 1 appearing at first output port 3 to the wavelength of the optical signal for a device in accordance with an embodiment of the present invention. In the device according to the present invention, the optical path lengths of the two paths 14 and 15 in the phase shift region between couplers 11 and 12 are significantly different in the absence of pumping power. The difference in optical path length can be provided by a difference in the physical length of the paths; by a difference in the propagation constants of the waveguides constituting the two paths, or both. At each peak 26 of transfer function 22, substantially all of the optical signal power applied through first input port 1 appears at the first output port 3, whereas at each valley 25 of the transfer function, substantially all of the optical signal power applied at port 1 appears at the second output port 4, and substantially none appears at the first output port 3.

Whereas curve 22 includes a plurality of peaks within the wavelength range shown, curve 21 is representative of a broadbanded characteristic, whereby only its peak appears within the wavelength range covered by FIG. 2.

The model discussed below shows that the amount of power required to cause a signal to switch between the two output ports of a Mach-Zehnder device is a function of the wavelength separation between a peak 26 and an adjacent valley 25, for example, of the zero-power transfer function represented by curve 22 of FIG. 2. Thus, the optical power required for switching is a function of the difference between the optical path lengths of waveguide paths 14 and 15 in the absence of pumping. The model is derived for the case where the paths have the same physical path length z and different propagation constants β. As the propagation constant of a waveguide is directly related to the effective refractive index n of the waveguide, the model is stated in terms of the effective refractive index. In order to calculate the power requirements, the model assumes that waveguide paths 14 and 15 in the phase shift region of FIG. 1 have different effective indices. Although the model assumes that the nonlinear material is silica, similar results would be obtained if it were silica doped with a material that enhanced the nonlinear property of the waveguide path.

The normalized output power for the device of FIG. 1 (before the introduction of the gating signal) is $$P = \cos^2(\pi z(n_2 - n_1)/\lambda) \quad (1)$$

where $n_2$ and $n_1$ represent effective indices of propagation in path 14 and path 15, respectively, and $\lambda$ is the signal wavelength. The length z of waveguide paths 14 and 15 is chosen so that at zero pumping power a $\pi/2$ phase change is introduced between the two wavelengths of interest, i.e., between the desired wavelength of the peak and the desired wavelength of the valley. If, for example, it is assumed that a maximum is to occur at wavelength $\lambda_1$ (point 26 of FIG. 2) and a minimum is to occur at wavelength $\lambda_2$ (point 25 of FIG. 2), z is given by $$z = [2(n_2 - n_1)(1/\lambda_1 - 1/\lambda_2)]^{-1} \quad (2)$$

The index change $\delta$ needed to cause switching at $\lambda_1$ is the index change due to applied optical power required to alter the transfer function so that a valley, rather than a peak, is aligned with wavelength $\lambda_1$. That is, $\delta$ is the amount by which the effective refractive index of one path must change, under the influence of the applied optical power, to provide a transfer function as illustrated by curve 27, with a slightly different period or difference in wavelengths between adjacent peaks and valleys, such that a valley falls at $\lambda_1$. For a system with given physical path lengths and given zero-power indices $n_1$ and $n_2$, $\delta$ is given by:

$$\pi \delta z/\lambda_1 = \pi(n_2 - n_1)z/\lambda_1 - \pi(n_2 - n_1)z/\lambda_2 \quad (3a)$$

so that $$\delta \propto \lambda_1[(n_2 - n_1)/\lambda_1 - (n_2 - n_1)/\lambda_2)] \quad (3b)$$

It is known that the rate of change in index per unit optical power per unit area, denoted $n_2^*$ (also referred to as "nonlinear index") for silica based fibers is $$n_2^* = 3.2 \times 10^{-16} \text{ cm}^2/\text{watt} \quad (4)$$

For a single mode fiber with an effective area of 75 μm², equation 4 becomes $$n_2^{**} = 4.3 \times 10^{-10}/\text{watt} \quad (5)$$

The required power (in watts) for switching in a device with a silica based nonlinear fiber is approximately $$P_s = 1.5 \delta/(4.3/10^{10}) \quad (6)$$

Figure 3:
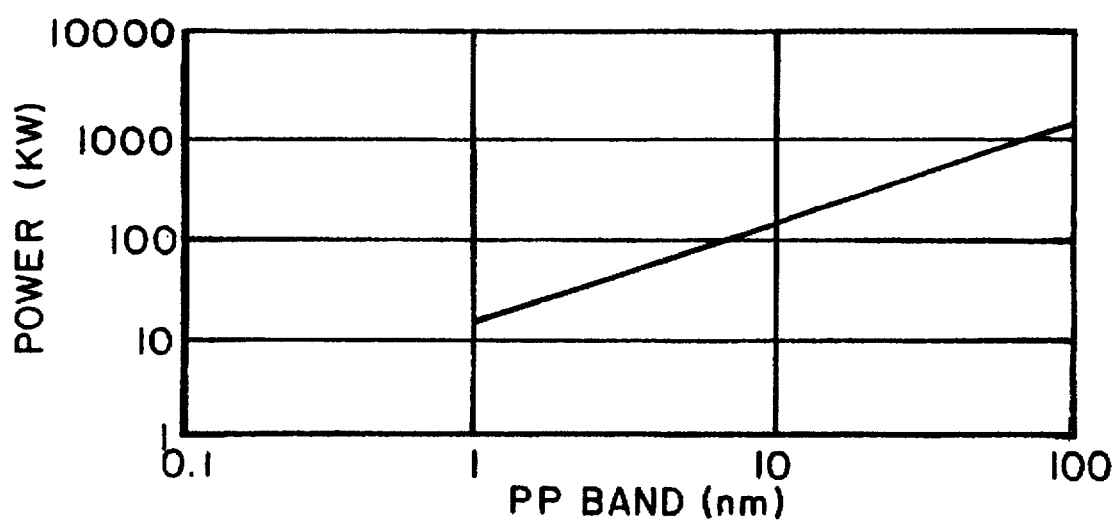
FIG. 3 is a plot of the power (PS) required for switching as a function of wavelength separation between adjacent peaks and valleys of the curve of FIG. 2.

FIG. 3 is a plot of the power ($P_s$) required for switching as a function of the PP Band, which is the separation in nm between a peak 26 and an adjacent valley 25 of the transfer function shown in FIG. 2, (i.e., $\lambda_1 - \lambda_2$). Where the zero-power transfer function is a simple periodic function of wavelength as shown in FIG. 2, the peak-to-valley separation is one-half the period of the transfer function. The power required to switch the device of FIG. 1, using silica as the nonlinear material, would be about 1000 kW if the fibers 14 and 15 had similar propagation constants in the absence of pump power, and if the device therefore had a flat or infinite-period transfer function. The plot shows that the power requirement for nonlinear switching in the device using silica as the nonlinear material is reduced by a factor of 100 (to about 10 kW) as the propagation constants of fibers 14 and 15 become sufficiently different that the difference in wavelength between valley 25 and peak 26 in FIG. 2 approaches 1 nm. For an erbium-doped or other rare-earth doped nonlinear material, the value of $n_2^*$ varies with the amount of doping and with wavelength. However, for typical erbium-doped materials operating at the wavelengths commonly used for optical communications, the value of $n_2^*$ is approximately $10^6$ times the value of $n_2^*$ given above for silica, i.e., about six orders of magnitude greater. Therefore, the power required to switch a device including the erbium-doped nonlinear material is about $10^6$ times (6 orders of magnitude less) than the power required for a corresponding device using silica as the nonlinear material. For a device using the erbium-doped nonlinear material but having a flat or infinite-period zero-power transfer function, approximately 1 watt of optical power is required for switching. By contrast, in a device according to a preferred embodiment of the present invention, using erbium-doped nonlinear material and having a zero-power transfer function with $(\lambda_1 - \lambda_2)$ of about 1 nm, the required optical power for switching is about 100 times less, i.e., about 10 milliwatts.

Similar results would be obtained for a device in which the lengths of the optical paths in the phase shift region are different; this configuration is often employed in planar devices.

It is preferred that the nonlinear material in the path exist only in the phase shift region rather than continue into and form part of the couplers so that the coupling characteristic is not affected by pump power. Another important advantage of this configuration is that it enables the use of relatively high loss doped fibers or waveguides to achieve nonlinearity, but since the doped fiber exists only between the couplers, loss is minimized. If the nonlinear material extends through the couplers, then the pump power should be applied to the fiber or path that does not contain nonlinear material, the pump power being coupled to the nonlinear fiber; this would minimize loss.

In conventional Mach-Zehnder switches of the type disclosed in the aforementioned Pantell et al. publication, optical waveguide paths 14 and 15 are relatively long, and problems arise as a result of the heating of the nonlinear path 14 when pump power propagates through it. In accordance with preferred embodiments of the present invention the heating problem is alleviated by forming the device as a monolithic structure whereby heat generated by the nonlinear arm of the phase-shift region is conducted to the remaining arm of the phase-shift region. Such a monolithic Mach-Zehnder device can be in the form of an overclad fiber structure or a planar circuit. However, the length of the Pantell et al. device is such that it is not suitable for such monolithic devices. For such monolithic devices to be practical, their length should not exceed about 15 cm.

As discussed above, preferred devices in accordance with the present invention provide nonlinear switching at significantly lower power levels (up to two orders of magnitude lower than with the conventional design disclosed in the Pantell et al. publication). Since there is a tradeoff between length of nonlinear fiber and switching power, this feature can be employed to render the phase-shift region sufficiently short that the entire device is easily fabricated as an overclad or planar structure. That is, the device can be shortened to an acceptable length, for fabrication as a monolithic device and the switching power can be correspondingly maintained at a relatively low level.

A monolithic overclad interferometric switch in accordance with the present invention can be formed in accordance with the teachings of U.S. Pat. No. 5,295,205 which is incorporated herein by reference. The monolithic structure of FIGS. 4 and 5 contains concatenated overclad couplers 41 and 42 that are joined by a phase shifting region 44. The device is formed by inserting optical fibers 46 and 47 into the bore 48 of a tube of matrix glass 49. Each of the optical fibers has a core surrounded by cladding of refractive index lower than that of the core. In the illustrated embodiment, fiber 46 is a single piece of fiber, and fiber 47 consists of sections 47a, 47b and 47c which are fused together prior to making the device. Section 47a, which is located in phase shift region 44, is doped with rare earth ions, while sections 47b and 47c do not contain rare earth ions. That portion of fiber 46 that is located in the phase shift region is designated 46a. Elongated, thin sections of the fibers extending through the couplers 41 and 42 form the coupling elements of each coupler. The coupling elements are disposed side-by-side parallel to one another so that light propagating along each coupling element can transfer to the adjacent coupling element by evanescent wave action. The ends 51a and 51b of fiber 46 define one input port and one output port, whereas the ends 55a and 55b of the other fiber 47 define the other input and output ports. Thus, input port 51a is directly connected to the phase shift region 46a of fiber 46 even though the input port and phase shift region lie on opposite sides of input end coupler 41. As used in this disclosure with reference to two elements disposed on opposite sides of a coupler, the term "directly connected" means that light can pass from one element to the other without undergoing transfer between parallel light-conducting elements of the coupler. Two fiber portions connected end-to-end through one coupling element of a coupler are directly connected to one another. By contrast, input port 51a is connected to the phase shift region 47a of the other fiber indirectly, through coupler 41; light can pass from port 51a to phase shift region 47a only by transfer between the narrowed, parallel fiber sections in coupler 41. The first output port 51b at the opposite end of fiber 46 is also directly connected to phase shift region 46a, whereas ports 55a and 55b are directly connected to phase shift region or path 47a and indirectly connected to phase shift region or path 46a.

Figure 5:
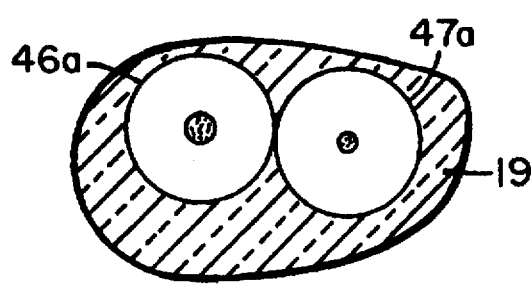
FIG. 5 is a cross-sectional view taken along lines 5—5 of FIG. 4.

The difference in propagation constants $\Delta\beta$ between the two fibers in the phase shift region 44 in the absence of pumping or switching power must be sufficient to enable switching at low power levels as discussed above. Any technique for obtaining different propagation constants can be employed. For example, the diameter of the core of fiber 47a can be smaller than that of fiber 46a as shown in FIG. 5. The different density of dots in the cores of fibers 46 and 47 illustrates that the core of fiber 47a contains rare earth ions. Alternatively, the fiber cores could have different refractive indices, or the fiber claddings could have different refractive indices or diameters. Any two or more of these features can be combined. Assuming the aforementioned maximum acceptable length of 15 cm and pump or switching power of less than 1 mW, then $\Delta\beta$ would be equal to or greater than 0.003.

The refractive index of that portion of the matrix glass tube adjacent the fibers is less than the lowest refractive index of either of the fiber claddings. The bore can be provided with funnels (not shown) at each end to facilitate insertion of the fibers. The combination of tube and fibers is referred to as a coupler preform.

That portion of the tube between points a and b is initially heated and collapsed onto the fibers and is at least partially fused to them. Also, the fibers are caused to contact one another, whereby there is good thermal conductivity between them. This can be accomplished by evacuating the tube bore, heating the tube near a first end 53 to cause it to collapse at the region of applied heat, and moving the preform relative to the heat source to gradually extend the collapsed region toward end 54 until the desired length of collapsed tube is obtained. Thereafter, coupler 41 is formed near end 53 of the tube by heating a region of the tube and moving those sections of the tube on opposite sides of the hot zone in opposite directions to stretch the heated region. The stretching operation is stopped after a predetermined coupling is achieved. While stretching the tube to form the first coupler, optical power can be coupled to an input optical fiber, and the output signals can be monitored to control process steps in the coupler manufacturing process.

For best performance, couplers 41 and 42 have substantially identical coupling characteristics over the signal wavelength band of interest. The second coupler 42 is therefore preferably formed near tube end 54 by subjecting the appropriate region of the tube to stretching conditions that are identical to those used to form the coupler 41.

Figure 4:
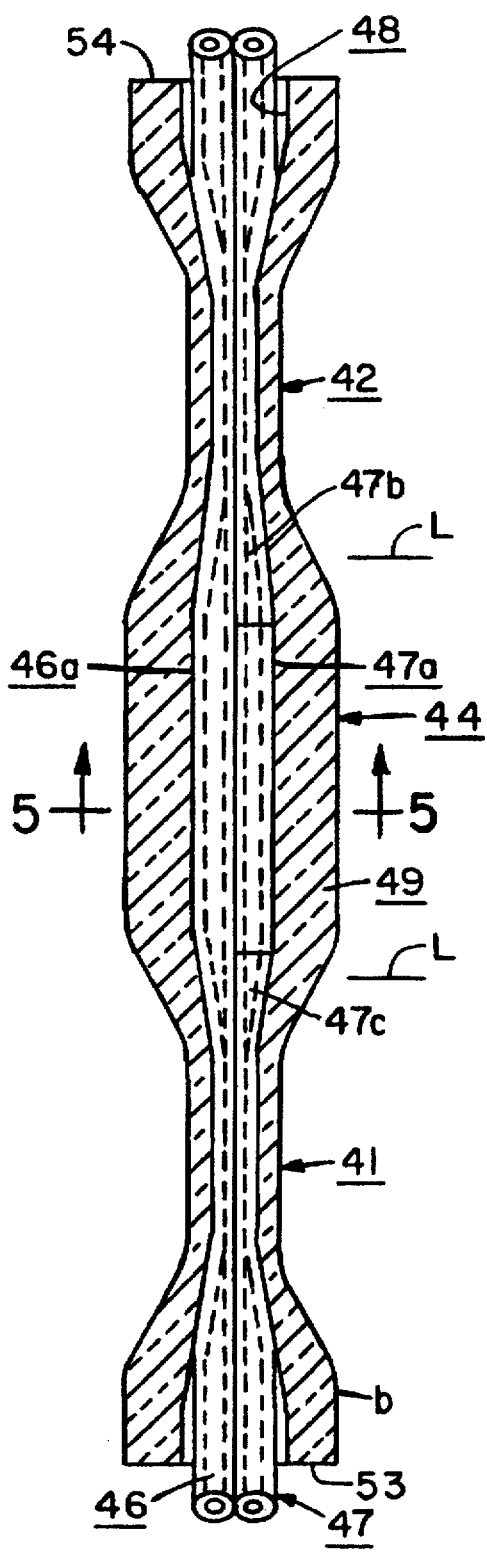
FIG. 4 is a cross-sectional view of a Mach-Zehnder switch formed in accordance with the present invention.

A Mach-Zehnder interferometric switch was constructed in accordance with the embodiment shown in FIGS. 4 and 5. Tube 10 was comprised of silica doped with 5 wt. % boron. Fiber 46 was a standard single-mode fiber having an outside diameter of 125 μm and a core diameter of 9 μm. The fiber cladding was formed of silica, and the core was formed of silica doped with a sufficient amount of germania to provide a core-clad $\Delta$ of 0.35%. Fiber 47 consisted of a single piece of erbium-doped fiber having an outside diameter of 125 μm and a core diameter of 4 μm. The fiber cladding was formed of silica, and the core was formed of silica doped with 1000 ppm by weight erbium and a sufficient amount of germania to provide a core-clad $\Delta$ of approximately 1.0%.

The tube was collapsed onto the fibers and stretched to form couplers 41 and 42 in accordance with the above-described method. The couplers were 3dB at 1550 nm. The overall length of the resultant device was 12.7 cm. The peak to valley wavelength separation (see FIG. 2) of the Mach-Zehnder switch was 6 nm in the absence of pump power.

Figure 6:
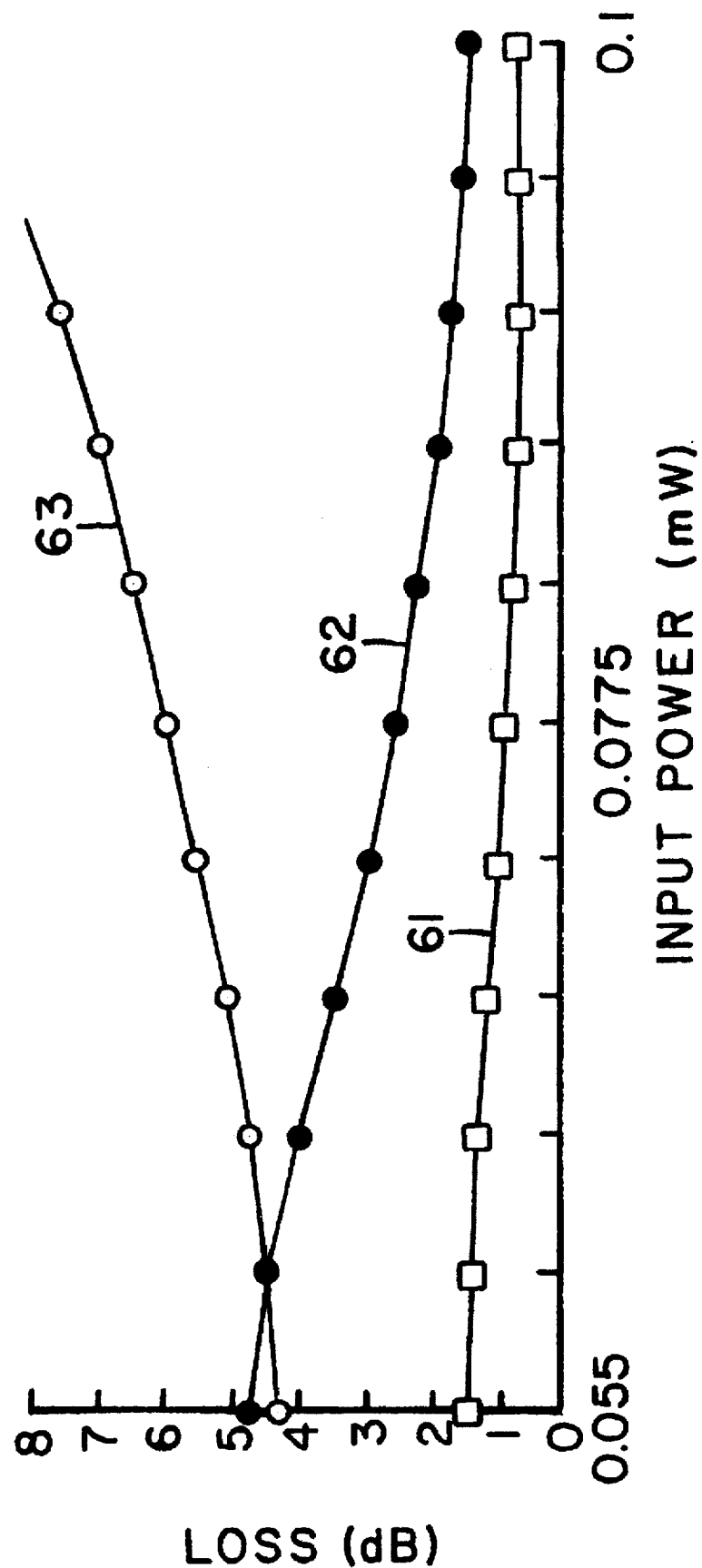
FIG. 6 is a graph illustrating loss vs. launch power for a Mach-Zehnder interferometric switch formed in accordance with the present invention.

A laser diode operating at 1521 nm was connected to input port 2 by an attenuator. This single source functioned as the signal and also provided the power for changing the index of the erbium-doped fiber. FIG. 6 shows the output of the device as a function input power. Curve 61 represents the device excess loss. Curve 62 represents the insertion loss between input port 2 and output port 4, and curve 63 represents the insertion loss between input port 2 and output port 3. Essentially all of the input appeared at output port 3 when the input power was low, the input switching to output port 4 as power level increased; FIG. 6 shows that switching occurred at an input power of less than one milliwatt. The specific example shows that the amount of power needed to cause a signal to switch between the two output ports 3 and 4 of FIG. 1 depends on the phase difference already existing between the two arms 14 and 15 of the phase shift region before the pump or gating pulse is introduced.

Figure 7:
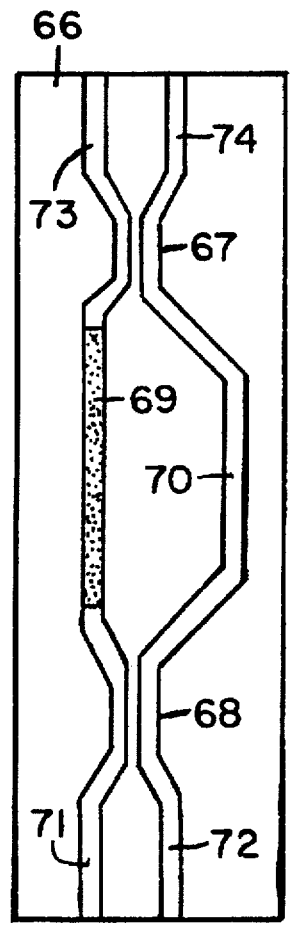
FIG. 7 shows a planar Mach-Zehnder interferometric switch.

FIG. 7 shows that embodiment in which the interferometric switch is formed as a planar device. All waveguide paths and couplers are formed in or on substrate 66. Input paths 71 and 72 are connected to phase shift paths 69 and 70 by coupler 68. Paths 69 and 70 are connected to output paths 73 and 74 by coupler 67. Path 70 is longer than path 69, whereby a phase shift is introduced between the signal components propagating through paths 69 and 70. The phase shift can also be induced by providing paths 69 and 70 with different refractive indices or widths. Although either of the paths 69 and 70 can be doped with a rare earth element, the shading on path 69 indicates such doping in that path. As described above, the refractive index of the doped path changes when pump power is introduced into the appropriate input path. This causes an input signal introduced at input path 71 or 72 to be switched from output path 73 to output path 74, for example.

Mach-Zehnder devices become increasingly more sensitive to temperature as the wavelength separation between the peaks of the power output vs. wavelength curve becomes smaller. However, suitable overclad devices of the type shown in FIG. 4 having a peak separation as small as 3.5 nm have been made, and devices having a peak separation of about 1 nm are possible. This is possible because the fibers in the phase shift region of the overclad structure are buried in the matrix glass. Thus, heat generated in the nonlinear fiber can conduct to the other fiber. Similarly, planar Mach-Zehnders are stabilized with respect temperature because heat can conduct from one path to the other through the substrate. Moreover, because the pumping power input required to induce switching is low for devices in accordance with the preferred embodiments of the invention, heat generation within the nonlinear path is also low.

Figure 8:
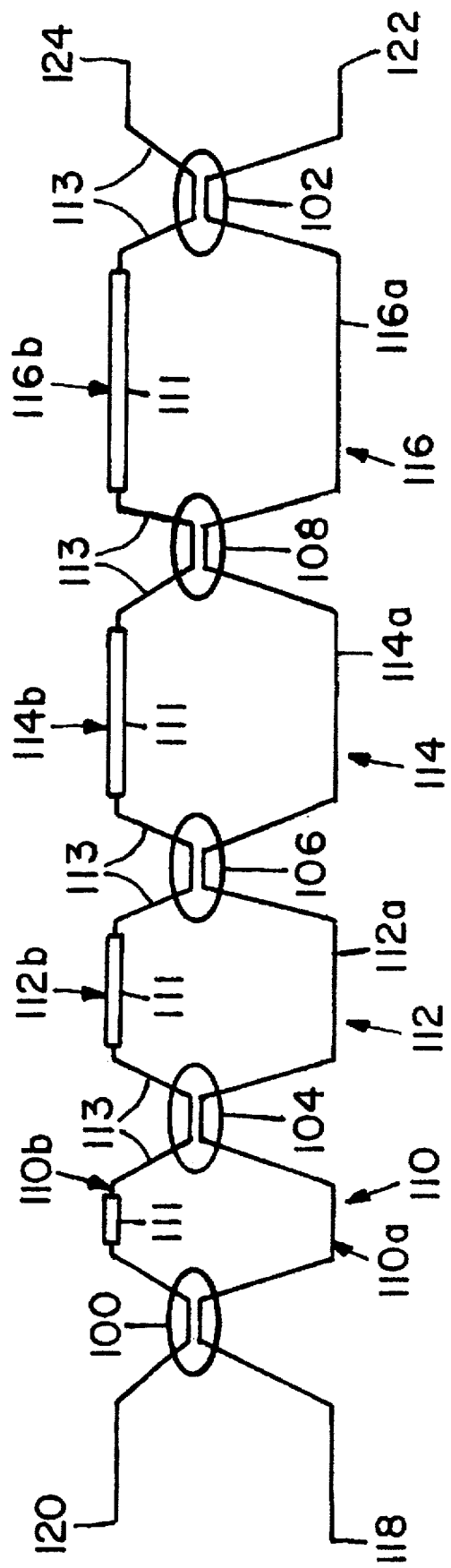
FIG. 8 is a schematic view depicting a device in accordance with a further embodiment of the invention.

As schematically illustrated in FIG. 8, a device according to a further embodiment of the invention may include a plurality of stages in series. The device includes a first or input-end coupler 100, a final or output-end coupler 102 and intermediate couplers 104, 106, and 108. The couplers are connected to one another in series by a plurality of groups of paths 110, 112, 114, and 116. Each group includes two paths connected in parallel with one another. Thus, the first group 110 includes a linear path 110a having optical properties substantially independent of the optical power coupled through the path, and a nonlinear path 110b incorporating a nonlinear material with power-dependent refractive index as discussed above. The other groups include similar linear paths 112a, 114a and 116a and nonlinear paths 112b, 114b and 116b. The device further includes a signal input port 118 and pumping input port 120 connected to the input-end coupler 100, and first and second output ports 122 and 124 connect to the output-end coupler 102. All of the nonlinear paths 110b, 112b, 114b and 116b are directly connected to one another through the intermediate couplers to form a continuous nonlinear path array. The pumping input port 120 is directly connected to nonlinear path 110b through the input coupler 100 and thus directly connected to the nonlinear path array. The linear paths 110a through 116a are also directly connected to one another at the intermediate couplers to form a continuous linear path array, which in turn is directly connected to the signal input port 118. Couplers 100, 104, 106 and 108 are arranged to couple light in a signal wavelength band between the path arrays, so that light in the signal wavelength band applied at signal input port 118 will be directed along the two paths 110a and 110b of the first group by input coupler 100, recombined at each succeeding coupler and again directed along one or both paths of the next group until the light reaches the output coupler 102, where it is directed to the first output port 122 or to the second output port 124.

The couplers are arranged to direct light in a pumping wavelength band, different from the signal wavelength band, substantially only along the nonlinear path array. The nonlinear materials should be sensitive to pumping power in the pumping wavelengths band. Where the device includes an erbium-doped nonlinear material, pumping wavelengths on the order of about 0.98 or 1.48 micrometers can be employed. Signal wavelengths preferably are in the ranges most used for optical fiber communications, such as about 1.5 to 1.6 micrometers, and typically about 1.52–1.57 micrometers. These signal wavelengths can also serve as pumping wavelengths for erbium-doped materials. Preferably, the couplers are arranged to provide essentially no coupling between the path arrays for light in the pumping wavelength band, so that light in the pumping wavelength band supplied through pumping input port 120 will propagate only through the directly connected elements, i.e., only through the nonlinear paths 110b–116b. The couplers may be evanescent couplers such as the overclad couplers discussed above with reference to FIG. 4, having juxtaposed parallel elements such as the narrowed fiber sections. Selective coupling of the light in the signal band but not in the pumping band can be achieved by providing the coupling elements with different dispersion characteristics. That is, the coupling elements are arranged to have substantially equal propagation constants for light in the signal wavelength band, but markedly different propagation constants for light in the pumping wavelength band.

The parallel paths in each group of paths have different optical path lengths at low power levels, i.e., in the absence of pumping power propagating through the nonlinear paths. Thus, with respect to the signal wavelengths, the device acts as a multi-stage lattice filter for light in the signal wavelength band. As described, in the Synthesis of Coherent Two-Port Lattice Form Optical Delay-Line Circuit, Jinguji et al., J. Lightwave Technology, Vol. 13 No. 1, January 1995, pp. 73–82, the transfer function of a filter including interferometric devices connected in series depends upon the characteristics of the paths constituting the device as well as the characteristics of the couplers. The transfer function of the device can be selected by selecting the characteristics of the paths and couplers.

One particularly useful arrangement has all paths within each group also equal to one another in physical length. At zero power the paths of each group have different effective refractive indices and hence different values of $\beta$. The differences in optical path length may increase progressively from group to group in the direction from the input end of the device to the output end. The coupling ratios of the couplers may also differ from one another. As used in this disclosure with reference to a coupler, the term "coupling ratio" means the ratio between the light power transferred from one path to another within the coupler to the light power remaining in its original path as it passes through the coupler. For example, in a coupler with a 90/10 coupling ratio 90% of the optical power arriving at the coupler along one path is coupled to the opposite path in the coupler, whereas 10% remains in its original path. Coupling ratios can also be stated as coupling percentage—the percentage of the total arriving light coupled over to the opposite path. Thus, a coupler with a 90/10 coupling ratio has 90% coupling, whereas a coupler of 15/85 coupling ratio has 15% coupling. In one exemplary device, input coupler 100 has a 5/95 coupling ratio; intermediate couplers 104, 106 and 108 have coupling ratios of 15/85, 25/75 and 15/85, respectively, whereas the output coupler 102 has a 5/95 coupling ratio.

Figure 9:
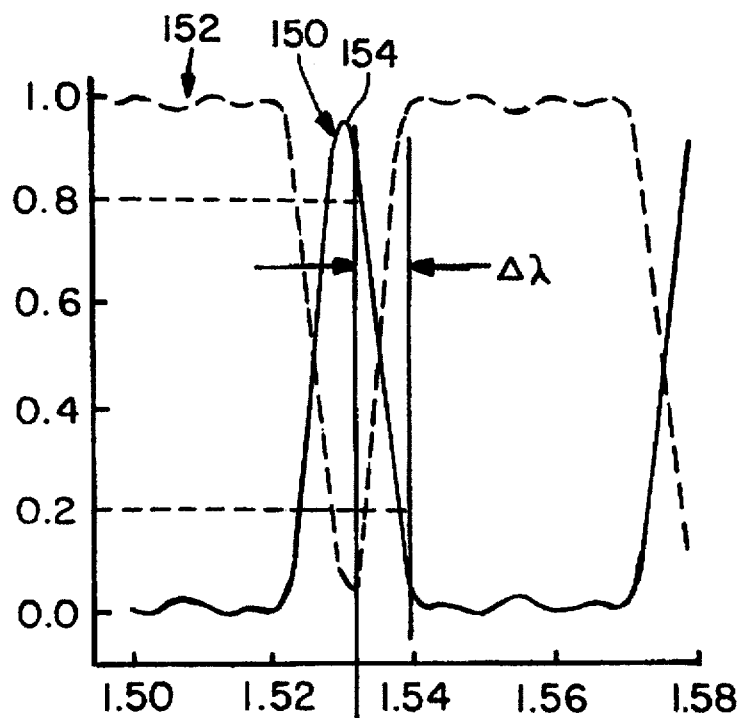
FIG. 9 is a graph depicting the zero-power transfer function of the device illustrated in FIG. 8.

Such a device can provide a zero power transfer function, relating the proportion of light supplied through signal input port 118 to the proportion of light exiting through second output port 124 as shown by curve 150 (FIG. 9). The zero-power transfer function between signal input port 118 and the first output port 122 is shown by a curve 152, also in FIG. 9. Zero-power transfer function 150 includes a narrow peak 154 at a wavelength $\lambda_1$ which in this instance is about 1.53 micrometers and valleys on the opposite sides of this peak. The valleys of the transfer function are relatively broad and flat. The peak to valley separation or $\Delta\lambda$ in such a case can be taken as the difference in wavelength between a point on the peak where the proportion of power reaching the output port in question is 0.8 times the maximum proportion, and the wavelength in the valley where the proportion of power reaching the port drops below 0.2 times its maximum value. That is, the peak to valley separation $\Delta\lambda$ mentioned above and discussed above with reference to FIGS. 2 and 3 should be taken as indicated in FIG. 9.

Figure 10:
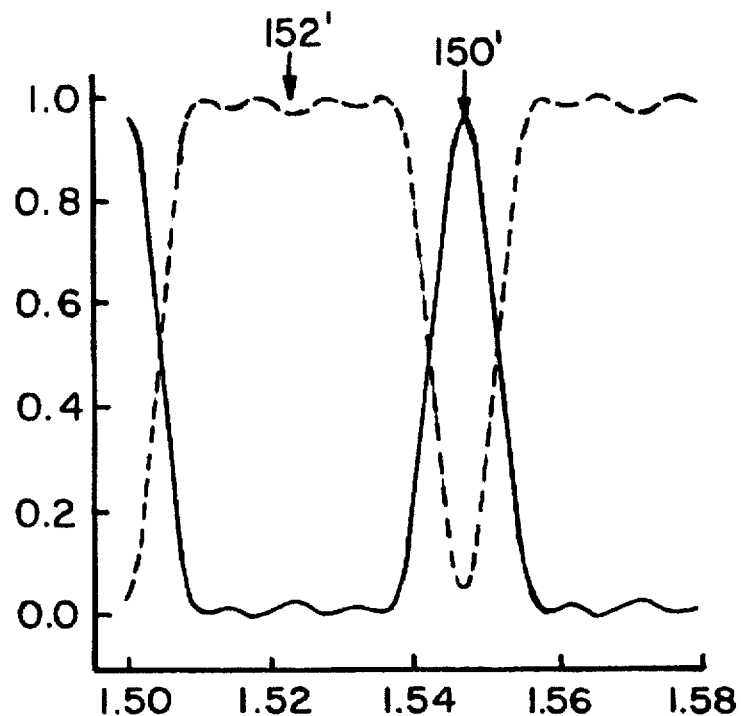
FIG. 10 is a graph similar to FIG. 8 but depicting the transfer function in the presence of optical pumping power.

Here again, when pumping light is supplied, the effective index of refraction of the nonlinear paths changes and the transfer functions also change. The transfer function between signal input port 118 and second output port 124 while pumping power is applied is indicated at 150' in FIG. 10, whereas the transfer function between the signal input port and the first output port under the same pumping conditions is shown at the 152'. As in the embodiments discussed above, switching occurs when the effect of pumping power is sufficient to shift a peak of the transfer function to a wavelength formerly occupied by a valley or vice versa. For example, in the absence of pumping power, light at about 1.542 micrometer wavelength falls in the valley of transfer function 150 and in the broad peak of transfer function 152 (FIG. 9). Thus, if light in this wavelength range is supplied through signal port 118, it will be directed out of the device through the first output port 122. However, upon application of pumping power, through pumping input port 120, the transfer function is modified to the form shown in FIG. 10 and light at the 1.542 micrometer wavelength is switched to the second output port 124.

Devices according to this nature can be used to good advantage in wavelength division multiplexing applications. Thus, a composite signal incorporating signals at several wavelengths can be supplied through the first or signal input port of the device and the optical pumping power can be controlled to align the peak in the transfer function of the second output port with one or another of these wavelengths selectively. This selectively routes one of the signals through the second output port while leaving the others routed through the first output port. The device can also be provided with an additional filter or filters downstream from the output port to remove light in the pumping wavelength band. Lattice or multi-stage devices of the type discussed above with reference to FIGS. 8–10 can also be fabricated as monolithic devices. Preferably, the devices can be made using the overclad approach discussed above with reference to FIG. 4. The linear path array and signal input port may be formed from one fiber, whereas the nonlinear path array may be formed from another continuous fiber. Preferably, the continuous fiber includes the nonlinear material only in sections 111 spaced apart from one another and connected to one another by linear fiber sections 113 devoid of the nonlinear material, so that the nonlinear and linear sections are arranged in alternating order. The linear fiber sections form the narrowed fiber sections of the couplers. The overcladdings of all of the couplers may be formed integrally with a tube overlying and encompassing all of the fibers.

Preferably, the sensitivity or difference in optical path length per unit of pumping power within the nonlinear path of each group is directly proportional to the zero-power optical path length difference provided by such group. Thus, path 112b provides a greater variation in optical path length per unit of pumping power than path 110b, and path 114b provides still greater sensitivity. Where the nonlinear path array includes alternating linear and nonlinear sections, the linear sections of the nonlinear path array may have the same properties as the linear path array. Where the path arrays are formed from fibers, the linear sections 113 of the nonlinear path array may be formed from lengths of the same fiber used to make the linear path array, whereas the nonlinear sections 111 may be formed from lengths of a nonlinear fiber incorporating the nonlinear material. In the absence of pumping power, the nonlinear fiber has different effective index of refraction than the linear fiber. The optical path length difference in each group at zero power is proportional to the length of the nonlinear fiber section included in the nonlinear path of the group. The sensitivity of the nonlinear path in each group is also proportional to the length of the nonlinear fiber section. Accordingly, the sensitivity of the non-linear path in each group will be directly proportional to the zero-power optical path length difference in such group.

Numerous variations and combinations of the features discussed above can be utilized without departing from the present invention as defined by the claims. Merely by way of example, a single-stage device, or each of the groups of fibers in a multi-stage device may include more than two paths extending parallel to one another. In a three path device, for example, one path in the phase shift region would be free from rare earth ions, the second path would have some rare earth ions, and the third path would have twice the amount of rare earth ions as the second path. Each of the paths in the phase shift region would delay the signal a different amount, the first path providing the least delay and the third path providing the most delay. Here again, the sensitivity of each path can be made proportional to the zero-power phase shift (delay). A method of making a N path intefferometric device (N>2) is disclosed in U.S. Pat. No. 5,351,325. Also, in a multi-stage device the nonlinear material may be provided in less than all of the groups of paths. That is, some of the path groups may include only linear paths, desirably with different optical path lengths. However, to enhance the sensitivity of the device to optical pumping power, it is preferred to include the nonlinear paths in all of the path groups. Moreover, it is not essential to provide the second output. That is, where the device is used only as a filter to block selected wavelengths, it need have only one output. The other, unused output, can be terminated with a standard antireflective termination. In each of the embodiments discussed above, each port is directly connected to one path. However, the input ports, output ports or both can be indirectly connected to the paths through the couplers. For example, a separate input fiber defining an input port can be indirectly connected to both paths 110a and 110b (FIG. 8) by the input-end coupler 100. As these and other variations and combinations of the features discussed above can be utilized, the foregoing description of the preferred embodiment should be taken by way of illustration rather than by way of limitation of the invention as defined by the claims.

What is claimed is:

1. A monolithic Mach-Zehnder switch comprising
input coupler means for splitting an input signal into N equal signal components, where N>1,
combining means for combining said N components, said combining means having at least first and second output terminals,
N optical waveguide paths connecting said N signal components to said combining means, at least one of said waveguide paths containing a material having a resonant nonlinearity, whereby the refractive index of the path changes when pump power propagates through it, said input coupler means and said combining means being free from said material, and
a matrix glass body, said input coupler means, said combining means and said optical waveguide paths being in thermal contact with said body.

2. A monolithic Mach-Zehnder switch in accordance with claim 1 wherein there is a difference $\Delta\beta$ between the propagation constants of said waveguide paths such that each of said N waveguide paths subjects the light propagating therethrough to a delay that is different from the delay experienced by light propagating through each of the other waveguide paths when no pump power is propagating through said at least one waveguide path.

3. A monolithic Mach-Zehnder switch in accordance with claim 2 wherein $\Delta\beta$ is equal to or greater than 0.003.

4. A monolithic Mach-Zehnder switch in accordance with claim 1 wherein the length of said matrix glass body is no greater than 15 cm.

5. A monolithic Mach-Zehnder switch in accordance with claim 1 wherein said paths are optical fibers, and wherein said fibers, said input coupler means and said combining means are surrounded by an elongated body of said matrix glass.

6. A monolithic Mach-Zehnder switch in accordance with claim 5 wherein said input coupler means and said combining means are regions in said body wherein the diameter of said body and the diameters of said fibers are smaller than the diameters thereof in said phase shift region.

7. A monolithic Mach-Zehnder switch in accordance with claim 1 wherein said matrix glass body comprises a planar substrate, said paths, said input coupler means and said combining means being located at the surface of said substrate.

8. A monolithic Mach-Zehnder switch in accordance with claim 1 wherein said material having a resonant nonlinearity is a rare earth.

9. A monolithic Mach-Zehnder switch comprising
an elongated body of matrix glass,
first and second optical fibers extending longitudinally through said body,
a phase shift region in said body,
two spaced coupler regions in said body at opposite ends of said phase shift region, the diameter of said body and the diameters of said fibers being smaller in said coupler regions than in said phase shift region,
at least that portion of said first fiber that is in said phase shift region containing a material having a resonant nonlinearity, whereby the refractive index of said first fiber changes when pump power propagates through it, said fibers having different propagation constants in said phase shift region in the absence of pump power propagating through said first fiber so that said first fiber subjects the light propagating therethrough to a delay that is different from the delay experienced by light propagating through said second fiber.

10. A monolithic Mach-Zehnder switch in accordance with claim 9 wherein said material having a resonant nonlinearity is a rare earth.

11. An interferometric switch comprising first and second optical couplers and first and second optical paths extending between said couplers, and means defining a first input port connected to said first coupler and a first output port connected to said second coupler, said paths having optical path lengths L1 and L2, respectively, between said couplers, at least one of said paths being a nonlinear path including a material having a resonant nonlinearity such that the refractive index of said material and the optical path length of the nonlinear path changes when optical pumping power propagates through such path, said path lengths L1 and L2 being different from one another in the absence of said optical pumping power.

12. A switch as claimed in claim 11 having a zero-power transfer function relating the proportion of light supplied through said first input port which appears at said first output port to wavelength in the absence of said optical pumping power, said transfer function including a peak at a first wavelength at which substantially all of the light appears at said first output port and a valley at a second wavelength at which substantially none of the light appears at said first output port said first and second wavelengths have a difference $\Delta\lambda$ therebetween of about 10 nm or less.

13. A switch as claimed in claim 12 wherein said first and second wavelengths have a difference $\Delta\lambda$ therebetween about 6 nm or less.

14. A switch as claimed in claim 13 wherein $\Delta\lambda$ is between about 1 nm and about 6 nm.

15. A switch as claimed in claim 11 further comprising a second output port connected to said second coupler.

16. A device as claimed in claim 11 wherein said first and second optical paths are constituted by first and second fibers, said first and second fibers extending through said couplers.

17. A device as claimed in claim 16 wherein portions of said fibers extend beyond said couplers and constitute said ports.

18. A device as claimed in claim 11 wherein said paths and couplers are formed as a monolithic unit.

19. An interferometric switch comprising at least three optical couplers and a plurality of optical paths extending between said couplers in groups so that said couplers are connected to one another in series by said groups of fibers, each such group including at least two said paths in parallel with one another, one of said couplers being an input coupler at one end of said series, another one of said couplers at an opposite end of said series being an output coupler, the device further including means defining a signal input port connected to said input coupler and a first output port connected to said output coupler, each said path having an optical path length between said couplers, at least one of said paths being a nonlinear path including a material having a resonant nonlinearity such that the refractive index of said material and the path length of the nonlinear path changes when optical power propagates through such path, said path lengths of the paths in at least one said group being different from one another in the absence of said optical pumping power, said device having a zero-power transfer function relating the proportion of light supplied through said first input port which appears at said first output port to wavelength in the absence of said optical pumping power, said zero-power transfer function including a peak at a first wavelength at which substantially all of the light appears at said first output port and a valley at a second wavelength at which substantially none of the light appears at said first output port.

20. A switch as claimed in claim 19 wherein each said group includes at least one nonlinear path having said nonlinear material.

21. A switch as claimed in claim 20 wherein said couplers are adapted to direct light in a signal wavelengths band including said first and second wavelength through all of said paths and to direct light in a pumping wavelength band outside said signal wavelength band only along said nonlinear paths, said nonlinear material being responsive to pumping radiation in said pumping wavelength band to alter its index of refraction.

22. A switch as claimed in claim 21 wherein said nonlinear paths are directly connected with one another at each of a plurality of said couplers to form a continuous nonlinear path array extending through a plurality of said couplers, the switch further comprising a pumping input port directly connected to said nonlinear path array, said couplers being effective to couple light in said signal wavelength band between paths but substantially ineffective to couple light at a pumping wavelength outside of said signal wavelength band between paths, whereby pumping light at said pumping wavelength applied to said pumping input port will propagate through only said nonlinear path array.

23. A switch as claimed in claim 22 wherein said paths are constituted by optical fibers, said nonlinear path array being constituted by a first continuous fiber extending through said plural couplers.

24. A switch as claimed in claim 23 wherein said first continuous fiber includes a plurality of spaced-apart nonlinear sections incorporating said nonlinear material and a plurality of linear sections free of said nonlinear material, said linear sections extending through said couplers.

25. A switch as claimed in claim 24 further comprising a second continuous fiber extending through a plurality of said couplers, said second continuous fiber constituting a second path array including paths in each of a plurality of said groups.

26. A switch as claimed in claim 25 wherein all of said paths are constituted by said first and second continuous fibers.

27. A switch as claimed in claim 23 further comprising a monolithic glass body surrounding said fibers, each said coupler being an overclad tapered coupler including narrowed portions of said fibers and said body.

28. A switch as claimed in claim 22 wherein each said group of paths includes a linear path having optical propagation properties substantially insensitive to pumping power, the linear paths of each said group being directly connected to one another and constituting a linear path array.

29. A switch as claimed in claim 22 wherein said first and second wavelengths have a difference $\Delta\lambda$ therebetween of about 10 nm or less.

30. A switch as claimed in claim 22 wherein said first and second wavelengths have a difference $\Delta\lambda$ therebetween about 6 nm or less.

31. A switch as claimed in claim 30 wherein $\Delta\lambda$ is between about 1 nm and about 6 nm.

32. A switch as claimed in claim 28 further comprising a second output port connected to said output coupler.

33. A switch as claimed in claim 32 wherein each said group consists of one said nonlinear path and one second path, each said coupler other than said output coupler being adapted to split light arriving at such coupler substantially equally between the paths extending to the next coupler, said output coupler being adapted to couple light arriving at said coupler unequally to said first and second output ports.

* * * * *